(12) United States Patent
Williams

(10) Patent No.: US 8,359,690 B1
(45) Date of Patent: Jan. 29, 2013

(54) TIRE CHANGING SYSTEM FOR VEHICLE

(76) Inventor: Willie L. Williams, Scotland Neck, NC (US)

( * ) Notice: Subject to any disclaimer, the term of this patent is extended or adjusted under 35 U.S.C. 154(b) by 0 days.

(21) Appl. No.: 13/270,702

(22) Filed: Oct. 11, 2011

(51) Int. Cl.
B25F 1/00 (2006.01)

(52) U.S. Cl. .......................................................... 7/100

(58) Field of Classification Search ...... 7/100; 152/415, 152/416
See application file for complete search history.

(56) References Cited

U.S. PATENT DOCUMENTS

| | | | | |
|---|---|---|---|---|
| 2,227,601 A | * | 1/1941 | O'Brien, Jr. .................. | 152/415 |
| 3,924,117 A | * | 12/1975 | Brindley ........................ | 362/191 |
| 4,037,638 A | * | 7/1977 | Mosca ........................... | 152/415 |
| 4,197,895 A | * | 4/1980 | Reyes ........................... | 152/416 |
| 4,506,317 A | * | 3/1985 | Duddy .......................... | 362/396 |
| 4,706,937 A | * | 11/1987 | Chung ........................ | 254/93 H |
| 4,872,230 A | * | 10/1989 | Levine .............................. | 7/100 |
| 5,587,698 A | * | 12/1996 | Genna .......................... | 340/442 |
| 5,765,810 A | * | 6/1998 | Mattera ........................ | 254/423 |
| 5,876,526 A | * | 3/1999 | Hamade et al. ............... | 152/416 |
| 6,237,953 B1 | * | 5/2001 | Farmer ........................ | 280/763.1 |
| 6,357,724 B1 | * | 3/2002 | Hung ............................. | 254/8 B |
| 6,773,132 B2 | * | 8/2004 | Gilligan et al. ............... | 362/119 |
| 6,832,402 B1 | | 12/2004 | Drago et al. | |
| 6,877,200 B2 | * | 4/2005 | Villarreal .................... | 29/402.08 |
| 7,357,526 B2 | * | 4/2008 | Zeiler ........................... | 362/119 |
| 7,611,127 B1 | | 11/2009 | Moore | |
| 2010/0212798 A1 | * | 8/2010 | Bothe, Jr. ..................... | 152/415 |

* cited by examiner

Primary Examiner — Robert Scruggs
(74) Attorney, Agent, or Firm — Dale J. Ream

(57) ABSTRACT

A tire changing system for use on a vehicle having a frame and four wheel wells formed above corresponding wheels includes a jack movable between lowered and raised configurations and an impact wrench configured to move the jack therebetween when actuated. The system includes an air compressor and air storage tank. An elongate primary hose is connected to the storage tank and extends along the vehicle frame, the primary hose having a plurality of outlet ports situated adjacent to respective vehicle wheel wells. A secondary hose includes a first end selectively coupled to a respective outlet port and a second end selectively connected to the impact wrench such that the impact wrench receives air flow from the storage tank. With a connection to the storage tank, the impact wrench may be used to remove lug nuts from a respective vehicle wheel and operate the jack.

15 Claims, 5 Drawing Sheets

TIRE CHANGING SYSTEM FOR VEHICLE

BACKGROUND OF THE INVENTION

This invention relates generally to tire changing equipment and, more particularly, to a tire changing kit that simplifies the task of changing an automobile tire. The tire changing kit eliminates the cumbersome use of traditional tire changing equipment and makes changing a flat tire simple for all drivers.

The common availability and use of cellular telephones and motorist assistance services has greatly reduced the fear that many motorists have regarding having a flat tire on their vehicle while driving. They may have a sense of security knowing that help is just "a phone call away." However, obtaining assistance in changing a tire or getting a ride to an urgent appointment may not always be available, such as where a flat tire is experienced in a remote area or if the motorist simply does not want to pay for such assistance.

Various devices have been proposed in the art to assist a motorist with changing a flat tire, such as portable kits, audio assistance, and devices mounted into portable jacks. Although assumably effective for their intended purposes, the existing devices either require electrical connections to the vehicle battery or require long hoses to be unraveled and then wrapped back up after use, etc.

Therefore, it would be desirable to have a tire changing system for use with a vehicle that includes an air compressor and storage tank mounted in the vehicle trunk. It would also be desirable to have a tire changing system in which a primary air hose connected to the air compressor and storage tank extends along the vehicle frame and includes a plurality of outlet ports extending into a respective wheel well area. In addition, it would be desirable to have a tire changing system having an impact wrench that may be connected to a respective output port at the site of the flat tire. It would be even more desirable to have a tire changing system having a safety light that may be positioned on or adjacent to the vehicle to alert other drivers that a flat tire is being changed.

SUMMARY OF THE INVENTION

A tire changing system according to a preferred embodiment of the present invention for use on a vehicle having a frame and four wheel wells formed above corresponding wheels includes a jack movable between lowered and raised configurations and an impact wrench configured to move the jack therebetween when actuated. The system includes an air compressor and air storage tank. An elongate primary hose is connected to the storage tank and extends along the vehicle frame, the primary hose having a plurality of outlet ports situated adjacent to respective vehicle wheel wells. A secondary hose includes a first end selectively coupled to a respective outlet port and a second end selectively connected to the impact wrench such that the impact wrench receives air flow from the storage tank. With a connection to the storage tank, the impact wrench may be used to remove lug nuts from a respective vehicle wheel and operate the jack.

Therefore, a general object of this invention is to provide a tire changing system for use with a vehicle to simplify the task of changing a flat tire.

Another object of this invention is to provide a tire changing system, as aforesaid, that includes an air compressor and air storage tank mounted in the trunk of the vehicle.

Still another object of this invention is to provide a tire changing system, as aforesaid, that includes a primary air hose extending from the air compressor to each wheel well of the vehicle so that the compressed air is accessible at the site of a flat tire.

Yet another object of this invention is to provide a tire changing system, as aforesaid, that includes an impact wrench that may be connected to the primary air hose for use in loosening lug nuts and for raising or lowering a jack.

A further object of this invention is to provide a tire changing system, as aforesaid, that is easy to use.

A still further object of this invention is to provide a tire changing system, as aforesaid, that is cost-effective to install on both new and used cars.

Another object of this invention is to provide a tire changing system, as aforesaid, that includes a safety light that may be magnetically positioned on a vehicle to alert other vehicles that a tire is being changed.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 5b is an isolated view on an enlarged scale taken from a portion of FIG. 5a.

DESCRIPTION OF THE PREFERRED EMBODIMENT

Figure 1:
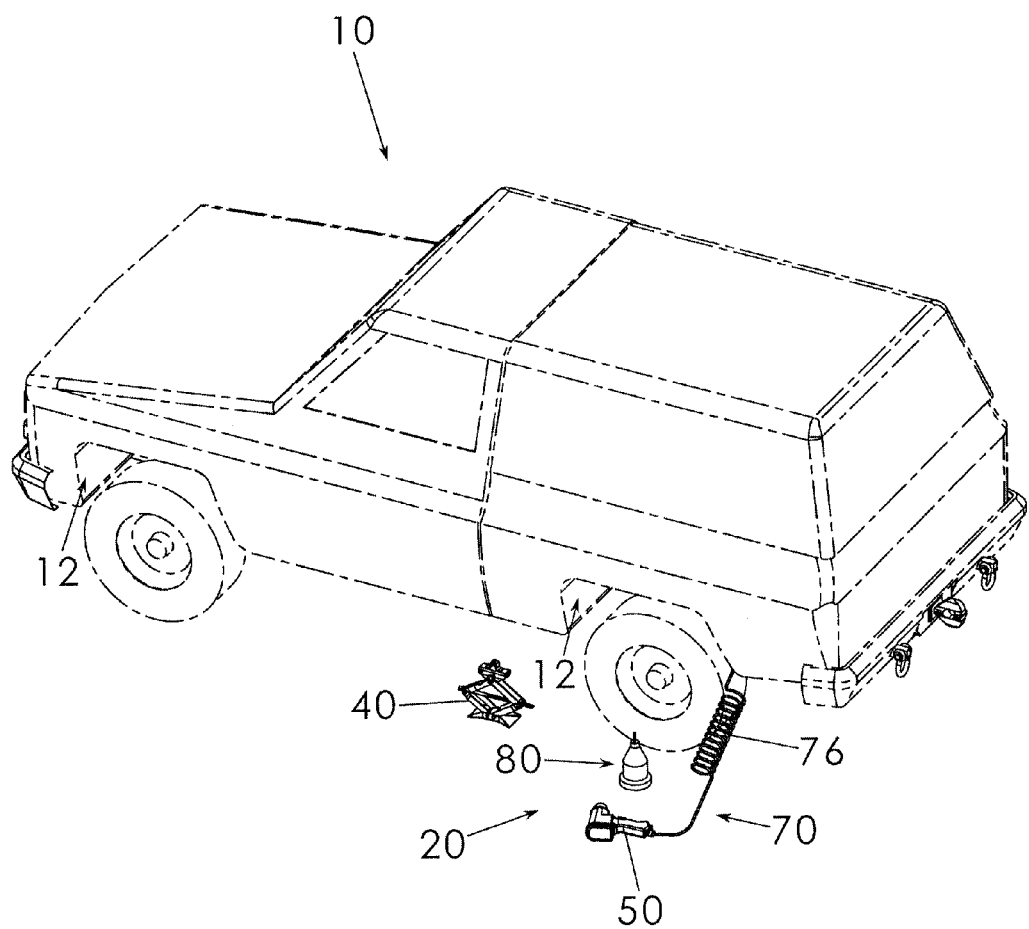
FIG. 1 is a perspective view of a tire changing system in use with a vehicle according to a present embodiment of the present invention.
Figure 2:
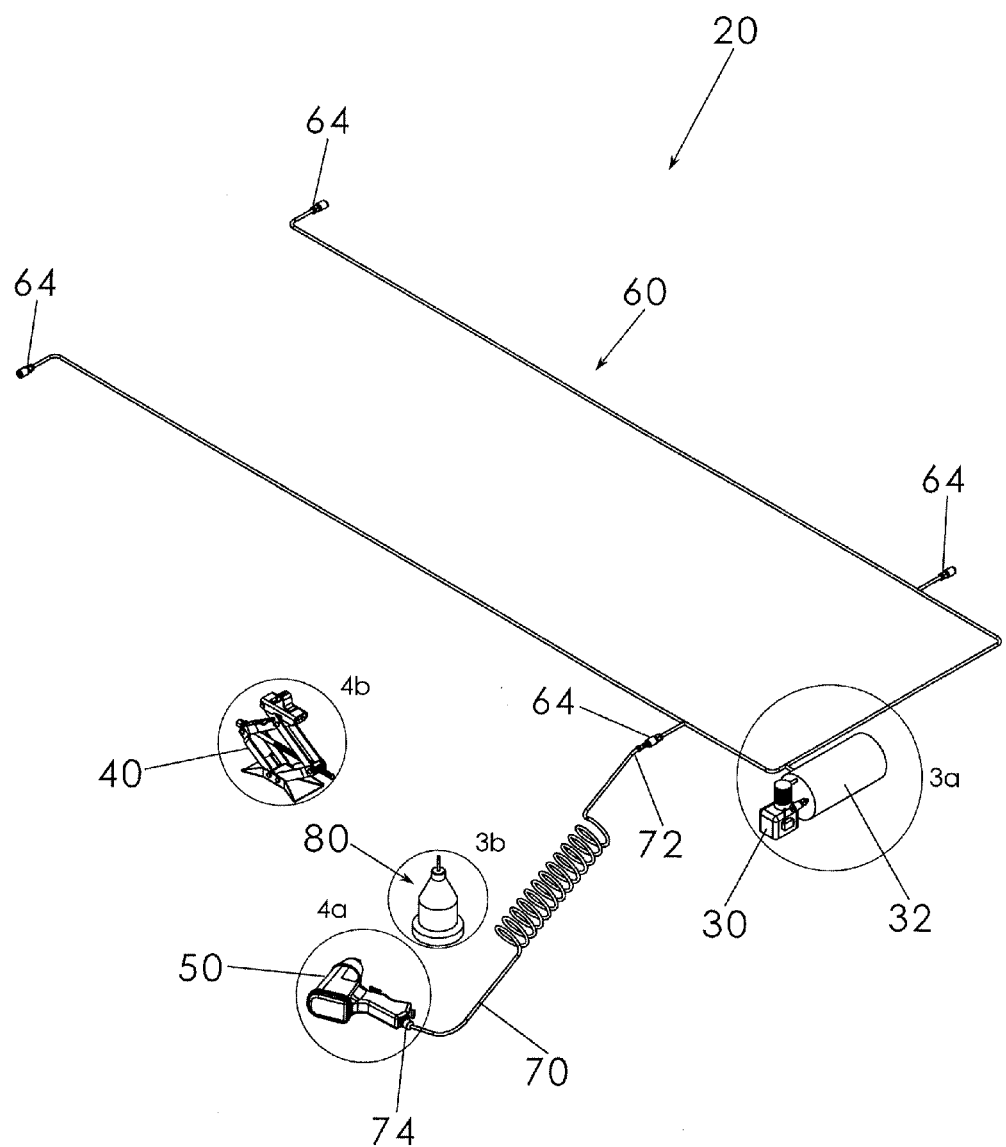
FIG. 2 is a perspective view of the tire changing system as in FIG. 1 removed from the vehicle.

A tire changing system according to a preferred embodiment of the present invention will now be described with reference to FIGS. 1 to 5b of the accompanying drawings. The tire changing system 10 includes an air compressor 30, a storage tank 32, a jack 40, an impact wrench 50, a primary hose 60 with a plurality of outlet ports 64, and a secondary hose 70 for coupling the impact wrench 50 to the air compressor 30.

The tire changing system 10 is useful when installed on a vehicle 10 having a trunk, a vehicle frame (not shown) having four wheel wells 12, each wheel well 12 defining a wheel well area around a respective tire and wheel combination of the vehicle. It is understood, of course, that the tire changing system 10 may also be installed on a vehicle other than a car having a trunk, such as a pickup truck having a truck bed rather than a trunk.

Preferably, the air compressor 30 is configured to be mounted permanently inside the trunk of an automobile, such as with bolts or the like. Similarly, the air storage tank 32 may be mounted inside the trunk adjacent the air compressor 30, the storage tank 32 being operatively connected to the air compressor 30 such that air is transferred into the tank 32 as it is generated by the air compressor 30. In some embodiments, the air compressor 30 and storage tank 32 may be mounted beneath a vehicle, such as by attachment to the vehicle frame. If mounted beneath a vehicle, however, it is understood that a durable housing may surround the air compressor 30 and storage tank 32 so that neither is likely to be damaged by rocks, brush, or objects on the roadway.

The jack 40 may be a mechanically activated jack having a manual scissor lift configuration, such as is common with vehicle jacks that are original equipment from the manufacturer of most automobiles today. More particularly, the jack 40 preferably includes a force transfer input 42 that, when actuated, selectively raises or lowers the jack 40. For instance, the force transfer input 42 may be a threaded bolt or worm gear threadably coupled to a linkage that pivotally expands or retracts the jack arms. The force transfer input 42 may include a free end 44 having a configuration complementary to an impact wrench socket 52. Accordingly, the impact wrench 50 may be operated on the force transfer input 42 to operate the jack 40 using the power of compressed air from the storage tank 32 as will be described in further detail below.

The impact wrench 50 includes a socket 52 that is complementary to the force transfer unit end 44 for operation of the jack 40 as described above. Further, the impact wrench 50 may include an input device 54, such as an input trigger, for activating rotation of the socket 52. It is understood, that the socket 52 and force transfer input end 44 may also be complementary to the configuration of lug nuts of a vehicle wheel such that the impact wrench 50 may be operated to remove or re-mount the lug nuts.

Figure 3A:
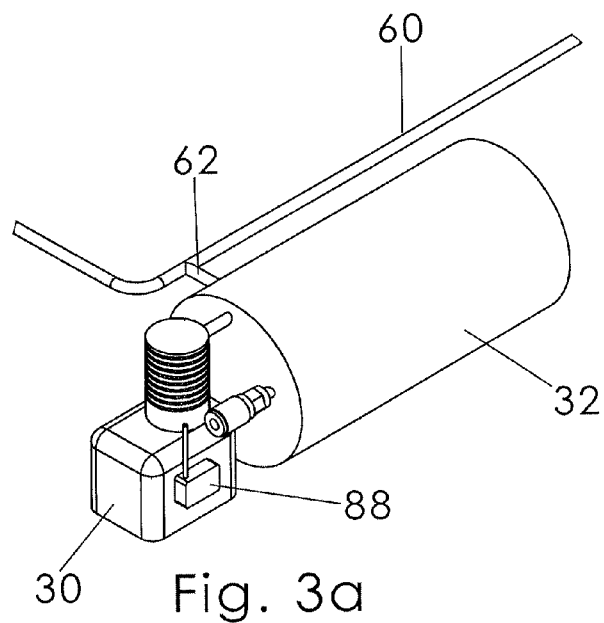
FIG. 3a is an isolated view on an enlarged scale taken from a portion of FIG. 2.
Figure 3B:
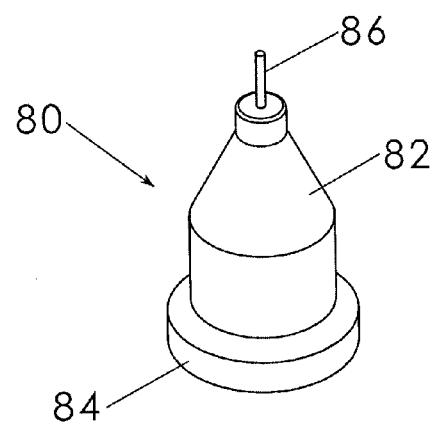
FIG. 3b is an isolated view on an enlarged scale taken from a portion of FIG. 2.
Figure 4A:
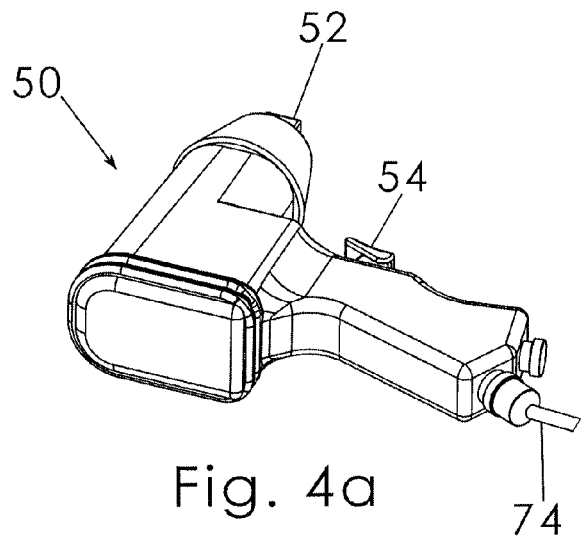
FIG. 4a is an isolated view on an enlarged scale taken from a portion of FIG. 2.
Figure 4B:
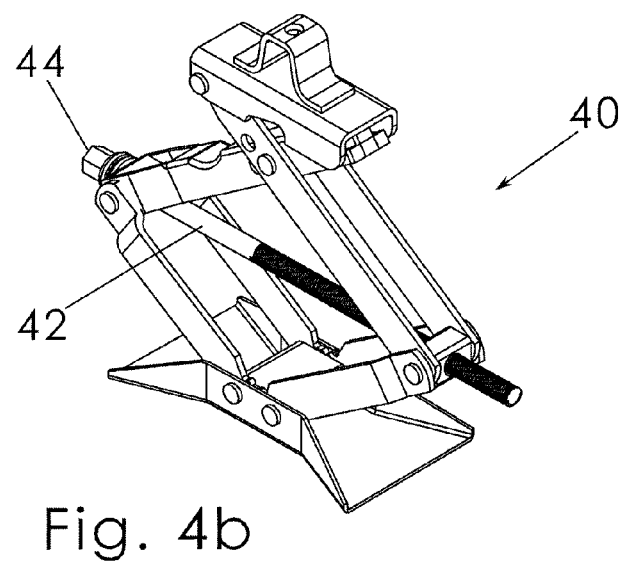
FIG. 4b is an isolated view on an enlarged scale taken from a portion of FIG. 2.

The primary hose 60 includes an elongate construction and is configured to transfer fluid therethrough. Preferably, the primary hose 60 is an air hose or tubing through which air may be efficiently transferred. The primary hose 60 is operatively coupled to the storage tank 32 such as by an inlet port 62 extending therebetween (FIG. 3a). In some embodiments, the primary hose 60 may be operatively coupled directly to the air compressor 30 for receiving air directly as it is generated as opposed to receiving it from the storage tank 32.

The primary hose 60 may extend along the wheel frame of the vehicle 10. In other words, the primary hose 60 may extend from the storage tank 32 along a left side of the vehicle frame and along the right side of the vehicle frame substantially between a trunk of the vehicle 10 and an engine compartment of the vehicle 10. The primary hose 60 may actually be coupled to the frame, such as could be accomplished by an automaker, or may be merely situated adjacent the frame.

The primary hose 60 includes a plurality of outlet ports 64 spaced apart from one another, each outlet port 64 being configured to receive air flowing through said primary hose 60, the outlet port being tubing or other channel construction. Preferably, there are four outlet ports 64, each outlet port 64 being situated adjacent a respective wheel well 12 of the vehicle 10. Further, each outlet port 64 includes a length and configuration that extends through a respective wheel well wall and into the respective wheel well area (FIG. 5b).

Figure 5A:
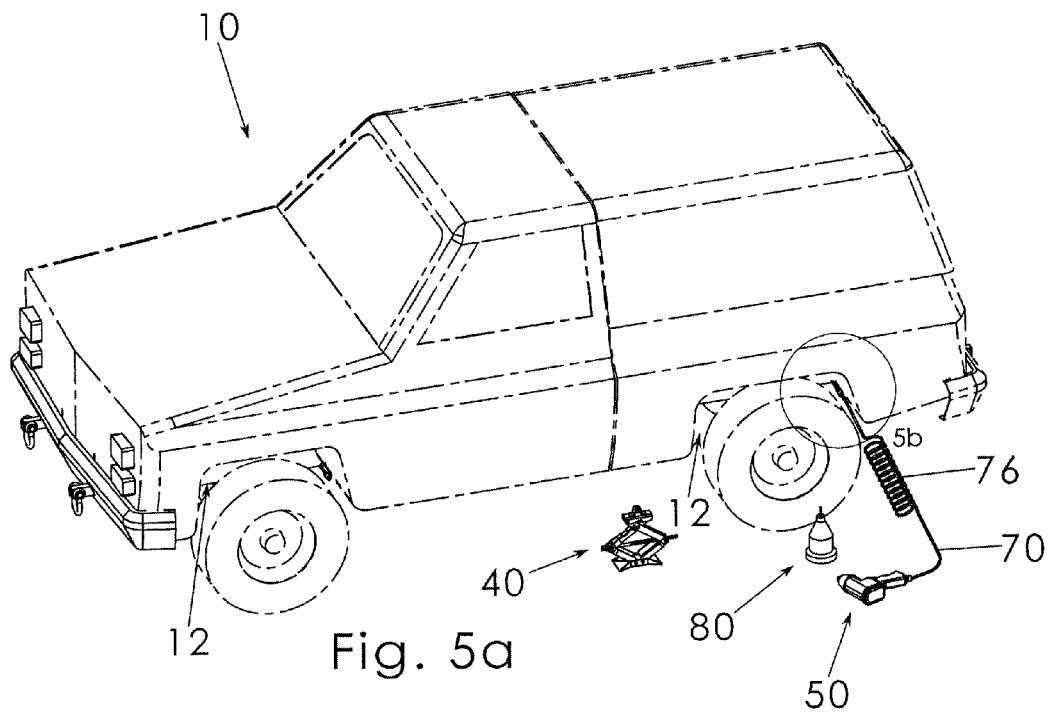
FIG. 5a is a perspective view of a tire changing system in use with a vehicle.
Figure 5B:
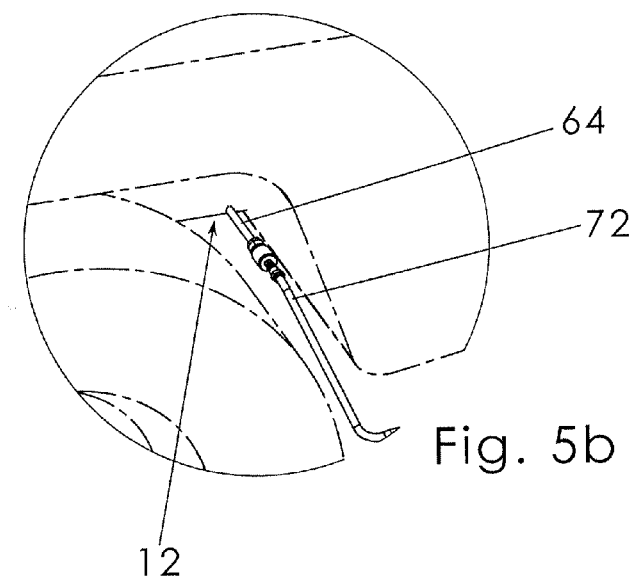

The secondary hose 70 includes a first end 72 having a configuration that is selectively and releasably coupled to a respective outlet port 64 extending into a respective wheel well area (FIG. 5b). Further, the secondary hose 70 includes a second end 74 opposed from the first end 72 having a configuration that is selectively coupled to the impact wrench 50. The secondary hose 70 is configured to transfer air from the storage tank 32 to the impact wrench 50 when the secondary hose 70 is coupled to a respective outlet port 64 and the primary hose 60 is operatively connected to the storage tank 32. The secondary hose 70 may also include an expansion section 76 intermediate the first 72 and second 74 ends. The expansion section 76 may have a configuration that is movable between a normally unexpanded configuration and an expanded configuration, the expansion section 76 being resilient or biased toward the unexpanded configuration.

The tire changing system 10 includes a lighting device 80 in the form of a safety light. The lighting device 80 may include a housing 82. A battery (not shown) and a light element (not shown), such as an LED or other type of light bulb, may be positioned in the housing 82, the light element being electrically connected to the battery so as to be illuminated when energized. Further, the lighting device 80 may include a magnet 84 attached to an outer surface of the housing 82 such that the housing 82 may be securely but releasably coupled to the side or top of the vehicle 10 to alert other drivers that a tire is being changed—or at least as to the presence of a hazard.

The lighting device 80 is configured to be activated whenever the air compressor 30 is activated, which is whenever a tire is being changed using the tire changing system 10. More particularly, the air compressor 30 is electrically connected to a transmitter 88 (FIG. 3a). The air compressor 30 includes circuitry configured to causes the transmitter 88 to send an activation signal when the air compressor 30 is actuated. The lighting device 80 is electrically connected to a receiver 86 such as an antenna. The lighting device 80 also includes circuitry configured to cause the battery to energize the light element when the receiver receives an activation signal. Accordingly, the lighting device 80 is energized to illuminate a tire changing area and to alert other drivers of a hazard situation whenever the air compressor 30 itself is actuated.

In use, the tire changing system 10 may be used to ease the burden of changing a flat tire. When a driver experiences a flat tire and has pulled over to a safe location, a user may first retrieve the secondary hose 70, jack 40, and lighting device 80 from the trunk of a car (or, bed of a truck, rear of an SUV, as the case may be). The lighting device 80 may be magnetically positioned on the exterior of the vehicle or just positioned on the ground near the path of other vehicles. The secondary hose 70 may be coupled to an appropriate outlet port 64 nearest the flat tire and coupled to the impact wrench 50. The jack 40 may be positioned under an appropriate structural part of the vehicle 10 to be lifted by the jack 40 as described above. The impact wrench 50 may also be used for loosening lug nuts of a respective wheel so that the flat tire may be removed and replaced. When the flat tire has been changed, the secondary hose 70, jack 40, impact wrench 50 and lighting device 80 may be returned to the trunk. It is important to note that the elongate primary hose 60 and the outlet ports 64 extending from the primary hose 60 into respective wheel wells 12 are permanently positioned and need not be positioned initially or put away after changing the tire.

It is understood that while certain forms of this invention have been illustrated and described, it is not limited thereto except insofar as such limitations are included in the following claims and allowable functional equivalents thereof.

The invention claimed is:
1. A tire changing system for use on a vehicle having a frame and four wheel wells formed above corresponding wheels, said tire changing system, comprising:
   a jack movable between lowered and raised configurations;
   an impact wrench configured to move said jack between said lowered and raised configurations when actuated;
   an air compressor;
   a storage tank in fluid communication with said air compressor and configured to store air under pressure;

an elongate primary hose operatively coupled to said storage tank and configured for air flow, said primary hose extending along the frame of the vehicle and having a plurality of spaced apart outlet ports;

wherein each outlet port is situated adjacent a respective wheel well and includes a length sufficient to extend into a wheel well area defined by the respective wheel well;

a secondary hose having a first end selectively coupled to a respective outlet port and a second end selectively coupled to said impact wrench such that said impact wrench selectively receives air flow from said storage tank when said secondary hose is coupled to said respective outlet port;

a lighting device including:
  a housing;
  a battery;
  a light element electrically connected to said battery and configured to emit light from said housing when energized by said battery;
  a magnet attached to said housing and configured to releasably couple said housing to a metal object when positioned thereon;

wherein:
  said air compressor is electrically connected to a transmitter;
  said air compressor having circuitry configured to cause said transmitter to transmit an activation signal when said air compressor is actuated;
  said lighting device is electrically connected to a receiver; and
  said lighting device includes circuitry configured to enable said battery to energize said light element when said receiver receives said activation signal.

2. The tire changing system as in claim 1, wherein said impact wrench includes an input device configured to actuate said impact wrench when said impact wrench is coupled to said secondary hose and said secondary hose is coupled to said respective outlet port of said primary air hose.

3. The tire changing system as in claim 2, wherein said input device is an input trigger.

4. The tire changing system as in claim 1, wherein said outlet port is tubing.

5. The tire changing system as in claim 1, wherein said primary hose is coupled to the frame of the vehicle substantially between a trunk of the vehicle and an engine compartment of the vehicle and along a left side and right side of the frame of the vehicle.

6. The tire changing system as in claim 1, wherein said air compressor and said storage tank are mounted inside a trunk of the vehicle.

7. The tire changing system as in claim 1, wherein said air compressor and said storage tank are mounted to a bottom of the vehicle frame.

8. The tire changing system as in claim 7, wherein said primary hose is operatively coupled directly to said air compressor and configured to obtain air therefrom.

9. The tire changing system as in claim 1, wherein said secondary hose includes an expansion section configured to have a selectively expandable length, said expansion portion being resilient and biased to return to an unexpanded condition.

10. The tire changing system as in claim 1, wherein:
  said jack includes a force transfer input coupled to said jack; and
  said impact wrench includes a socket configured to operatively connect with said force transfer input to actuate said jack to move between said lowered and raised configurations.

11. The tire changing system as in claim 1, wherein said impact wrench includes an input device configured to actuate said impact wrench when said impact wrench is coupled to said secondary hose and said secondary hose is coupled to said respective outlet port of said primary air hose.

12. The tire changing system as in claim 11, wherein said input device is an input trigger.

13. The tire changing system as in claim 12, wherein:
  said primary hose is coupled along a left side and right side of the frame of the vehicle substantially between a trunk of the vehicle and an engine compartment of the vehicle; and
  said air compressor and said storage tank are mounted inside a trunk of the vehicle.

14. The tire changing system as in claim 12, wherein said air compressor and said storage tank are mounted to a bottom of the vehicle frame of the vehicle.

15. The tire changing system as in claim 12, wherein said primary hose is operatively coupled directly to said air compressor and configured to obtain air therefrom.

* * * * *